March 26, 1940.  A. S. MILLIKIN  2,195,221
APPARATUS FOR BUILDING ROADS
Filed Dec. 23, 1938
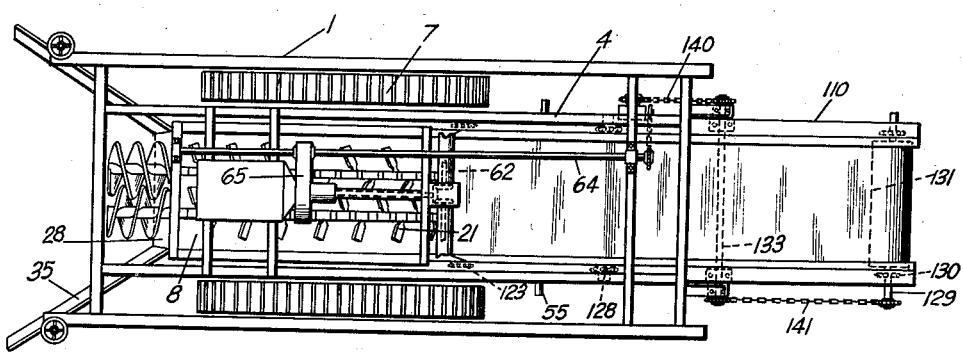
*Fig. 1*
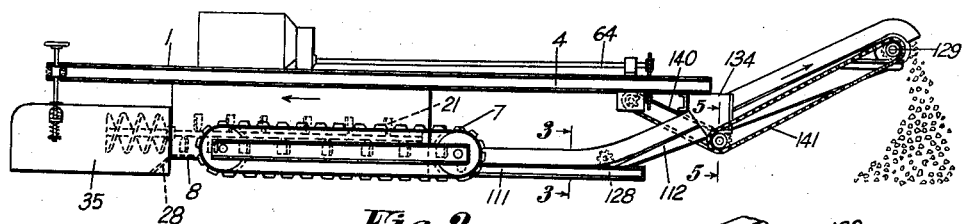
*Fig. 2*
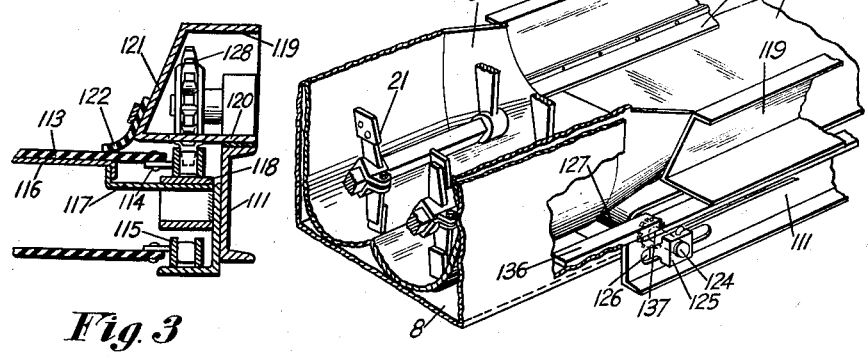
*Fig. 3*  *Fig. 4*
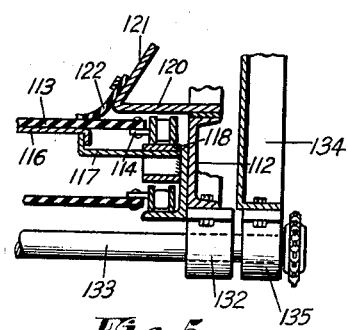
*Fig. 5*
INVENTOR
Arnold S. Millikin.
BY *Cates & Mahoney*
ATTORNEYS Patented Mar. 26, 1940

2,195,221

UNITED STATES PATENT OFFICE 2,195,221

APPARATUS FOR BUILDING ROADS

Arnold S. Millikin, Columbus, Ohio, assignor to The Jaeger Machine Company, Columbus, Ohio, a corporation of Ohio Application December 23, 1938, Serial No. 247,439

4 Claims. (Cl. 94—40)

My invention relates to apparatus for building roads. It has to do, more particularly, with a machine which is particularly adaptable to building low cost roads or retreading roads with such material as bituminous mixtures or other relatively low cost materials now commonly used. It relates more specifically to a machine for passing through materials previously applied to or forming a part of the surface to be treated which scoops up such material, thoroughly mixes it and then deposits it on the surface behind the machine.

In the co-pending application, Joseph H. Mosel, Serial No. 139,230, filed April 26, 1937, there is disclosed a machine which is composed of two units which operate in conjunction with each other. One of these units embodies a mixing and spreading unit which thoroughly mixes the material, which has been previously applied to or forms a part of the surface to be treated, and which spreads the material across the surface to be covered. This unit embodies a mixing chamber suspended from the main framework and having a pair of cooperating longitudinally extending pugmills disposed therein. At the forward end of the mixing chamber, means is provided for gathering in material and slightly raising it from the surface and directing it into the mixing chamber. As the machine advances, the material passes rearwardly through the mixing chamber and finally is discharged on the surface at the rear of the chamber. With the machine disclosed in said co-pending application, a transversely disposed spreading member is provided for spreading the discharged material laterally of the surface. A second unit is associated with the mixing and spreading unit which embodies runners and a transversely extending strike-off member which finish and mold the material to form a layer of slab therefrom.

In some instances it is desirable that the machine gather the material from the surface, thoroughly mix it and then discharge it at the rear of the machine in the form of a high windrow of large cross-sectional area without spreading or finishing it. For example, this would be desirable when the mixed material must be aerated prior to laying out or where it is desirable to have the material set a while before laying out. Therefore, the present invention relates to a unit which can be attached to the mixing unit of the machine disclosed in said co-pending application and which will receive the material from the mixing chamber and will deposit it on the surface at the rear of the machine in the form of a windrow. The windrow will be a high windrow of large cross-sectional area and will be of much greater area than it would be possible to produce by merely discharging it from the rear end of the mixing chamber. This unit can be readily attached to the mixing unit after the molding and finishing unit is detached therefrom.

The preferred embodiment of my invention is illustrated in the accompanying drawing wherein similar characters of reference designate corresponding parts and wherein:

Figure 1 is a plan view of a machine constructed according to my invention.

Figure 2 is a side elevation of the machine shown in Figure 1.

Figure 3 is a transverse section taken substantially along line 3—3 of Figure 2.

Figure 4 is a perspective view of the rear portion of the mixing trough showing the material-receiving conveyor in association therewith.

Figure 5 is a transverse section taken substantially along line 5—5 of Figure 2.

With reference to the drawing, I have illustrated a machine which embodies a mixing unit 1. This mixing unit 1 is identical with the mixing unit disclosed in said co-pending application S. N. 139,230, and need not be described in detail. It is supported on a pair of crawler tractor units 7. The mixing trough 8 is suspended from the frame of the machine and has a pair of longitudinally extending pugmills 21 disposed therein. A rearwardly and upwardly inclined plate 28 is provided at the forward end of the mixing trough for raising the material thereinto as the machine advances. A pair of forwardly diverging gathering wings 35 are also provided for directing material into the forward end of the mixing trough. As described in said co-pending application, as the machine moves forwardly the material will be guided into the forward end of the mixing trough. It will be carried rearwardly through the trough by the pugmills 21 and as it passes through the trough it will be thoroughly mixed. It will be discharged from the rear end of the trough.

However, in the present instance, instead of providing a screw spreading member (corresponding to member 53 of said copending application) disposed behind the mixing trough for receiving and spreading the mixed material and a finishing and molding unit (corresponding to unit 2 of said co-pending application), I provide a conveyor unit 110 which receives the mixed material, raises it upwardly and then discharges it onto the surface at the rear of the machine to form a windrow therefrom. This conveyor unit may be readily attached to the mixing unit 1 of the machine of said co-pending application merely by removing the finishing and molding unit and the screw spreading member 53.

As shown in the drawing, the conveyor unit 110 embodies a pair of side beams 111 which are suitably secured together in laterally spaced relationship. These beams 111 extend rearwardly and are substantially horizontally disposed. Similar beams 112 are rigidly secured to the rear ends of the beams 111 and extend rearwardly and upwardly. The beams 111 and 112 and the connecting means therefor serve as a supporting frame for the conveyor unit. A belt conveyor is supported on this frame. This belt conveyor embodies an endless belt 113. As indicated in Figures 3 and 5, each edge of the belt is secured at 114 to an endless chain 115. The belt 113 is preferably of a suitable flexible material such as rubber or fabric. The belt rests and slides over a plate 116 which will prevent sagging thereof. The plate 116 is supported at each edge by a plate 117 which is secured to rails 118 at each side of the conveyor upon which the upper flight of the chain 115 will rest. In order to prevent the material from reaching the chain 115, a metal guard 119 is provided at each side of the conveyor adjacent the belt. This guard embodies a horizontal portion 120 which overlies the chain and a substantially vertical but outwardly inclined portion 121 which keeps the materials from falling off the conveyor belt. A guard 122 is secured to the lower edge of the portion 121 of guard 119. The guard 122 is made of the same material as the belt 113 and its lower edge rests on the belt 113. Thus, material will be prevented from reaching the chain 115. The portion 120 of the guard 119 may be welded or otherwise secured to the upper edge of the beams 111 and 112.

The chains 115 pass over sprockets 123 which rotate freely on a transversely extending shaft 124 mounted on the forward ends of the beams 111. The shaft 124 is disposed in bearing members 125 which are adjustable in slots 126 in order to tighten or loosen the chain 115. The shaft 124 also carries a roll 127 around which the belt 113 passes. At the angle where the beams 111 and 112 are joined together, idler sprockets 128 are provided at each side of the conveyor in order to change the course of the chain 115. As illustrated in Figure 3, the sprocket 128 is disposed within a housing above the chain a portion of which is formed by the guard 119. At the upper and rear ends of the beams 112 a shaft 129 is rotatably supported. This shaft carries sprockets 130 around which the chains 115 pass and also carries a roll 131 around which the belt passes.

Adjacent the lower ends of the beams 112, as indicated in Figure 5, bearing members 132 are provided which are secured to the beams 112. These bearings 132 receive a transversely extending shaft 133. The rear ends of the beams 4 of the mixing unit 1 are provided with depending bracket plates 134. These plates 134 carry bearing member 135 on their lower ends through which the shaft 133 passes. The entire weight of the conveyor unit 110 is supported on the shaft 133 which in turn will suspend the unit from the beams 4. The greater portion of the weight of the unit 110 is below the shaft 133. This will tend to tilt the forward ends of the beams 111 downwardly. In order to prevent this, the forward ends of the beams 111 are provided with forwardly extending bars 136 which have their rear ends welded as at 137 to the upper edges of the beams 111. The forward ends of these bars 136 will rest on the upper surface of the bottom of the mixing trough 8. The forward end of the conveyor unit is provided with a funnel portion 138 which extends into the mixing trough. Thus, the material will readily pass from the rear end of the mixing trough into the forward end of the conveyor unit.

The conveyor unit is driven by means of a chain and sprocket drive 140 from the drive shaft 64 on the unit 1. The drive 140 drives the shaft 133. The shaft 133 in turn drives the shaft 129 by means of a chain and sprocket drive 141. Thus, the conveyor is positively driven.

It will be apparent that the conveyor unit may be readily attached to or removed from the unit 1. To attach it it is merely necessary to move the conveyor into position with the bars 136 resting on the bottom of the mixing trough. Then the rear end of the conveyor is elevated between the brackets 134, and the shaft 133 passed through the aligning bearings 132 and 135. The conveyor will then be supported in position. To remove the conveyor unit it is merely necessary to remove the shaft 133. When the conveyor unit is removed, if desired the spreading member 53 of the machine of said co-pending application may be attached to the pivot pins 55 in the manner described in said application and the molding and finishing unit may be attached to the machine if desired.

It will be apparent that as the mixed material leaves the trough 8, it will be discharged onto the belt conveyor and will then be carried rearwardly and upwardly. It will be discharged from the rear end of the conveyor unit and will be deposited in the form of a windrow as illustrated in Figure 2.

During operation of the machine, the conveyor and the pugmills are driven at a much higher rate of speed than the speed of movement of the machine along the surface to be treated. For this purpose the gear unit 65 is of such a type and is connected to shaft 64 in such a manner that the shaft will be driven at a higher rate of speed than the shafts 62 which drive the crawler elements 7. Consequently, the conveyor will produce a high windrow of a large cross-section. The windrow will be much larger and higher than that which could be produced merely by discharging from the mixing trough. Thus, the material of the windrow will be in such quantity that it later can be spread over a greater width of surface.

It will be apparent that the conveyor is of such a nature that it may be readily attached to or removed from the unit 1 with a minimum amount of trouble.

Various other objects and advantages will be apparent from the preceding description, the drawing and the following claims.

Having thus described my invention, what I claim is:

1. A road-building machine for receiving and mixing material disposed on the surface to be treated comprising a frame mounted on traction means, a longitudinally extending mixing compartment carried by the frame in spaced relationship to the surface over which the machine will pass, means for causing material to enter the front end of said compartment as the machine advances, a longitudinally extending mixing member disposed in said compartment, mixed material being adapted to pass from the rear of said compartment, and means located adjacent the rear of said compartment to enable the machine to discharge a windrow of mixed material of greater cross-section than the cross-sectional area adjacent the discharge end of said compartment, said means comprising a conveyor extending upwardly and rearwardly, and means for driving said conveyor and said traction means, said last-named means serving to drive the conveyor at a higher rate of speed than the traction means.

2. A road-building machine for receiving and mixing material disposed on the surface to be treated comprising a frame mounted on traction means, a longitudinally extending mixing compartment carried by the frame in spaced relationship to the surface over which the machine will pass, means for causing the material to enter the front end of said compartment as the machine advances, a longitudinally extending rotatable mixing and conveying member disposed in said compartment which will mix the material and will feed it rearwardly through the compartment as the machine advances, mixed material being adapted to pass from the rear end of said compartment, and means located adjacent the rear end of said compartment to enable the machine to discharge a windrow of mixed material of greater cross section than the cross-sectional area adjacent the discharge end of said compartment, said means comprising a conveyor for receiving the material discharged from said compartment and extending upwardly and rearwardly, and means for driving said traction means, said mixing and conveying member and said conveyor, said means serving to drive the conveyor and the mixing and conveying member at a higher rate of speed than the traction means.

3. A road-building machine for receiving and mixing material disposed on the surface to be treated comprising a frame mounted on traction means, a longitudinally extending mixing compartment carried by the frame in spaced relationship to the surface over which the machine will pass, means for causing the material to enter the front end of said compartment as the machine advances, a longitudinally extending rotatable mixing and conveying member disposed in said compartment which will mix the material and will feed it rearwardly through the compartment as the machine advances, mixed material being adapted to pass from the rear end of said compartment, and means located adjacent the rear end of said compartment to enable the machine to discharge a windrow of mixed material of greater cross-section than the cross-sectional area adjacent the discharge end of said compartment, said means comprising a conveyor for receiving the material discharged from said compartment and extending upwardly and rearwardly, and means for driving said traction means, said mixing and conveying member and said conveyor, said means serving to drive the mixing and conveying member at such a rate of speed that the material will be fed through the mixing compartment at a higher velocity than the velocity of movement of the machine, said means also serving to drive the conveyor at such a rate that it will handle the material discharged from said compartment.

4. A road-building machine for receiving and mixing material disposed on the surface to be treated comprising a frame mounted on traction means, a longitudinally extending mixing compartment carried by the frame in spaced relationship to the surface over which the machine will pass, means for gathering a mass of material and for causing the material to enter the front end of said compartment as the machine advances, a longitudinally extending rotatable mixing and conveying member disposed in said compartment which will mix the material and will feed it rearwardly through the compartment as the machine advances, mixed material being adapted to pass from the rear end of said compartment, and means located adjacent the rear end of said compartment to enable the machine to discharge a windrow of mixed material of greater cross-section than the cross-sectional area adjacent the discharge end of said compartment, said means comprising a conveyor for receiving the material discharged from said compartment and extending upwardly and rearwardly, and means for driving said traction means, said mixing and conveying member and said conveyor, said means serving to drive the mixing and conveying member and the conveyor at such a rate of speed that the material will be fed through the mixing compartment and will be moved along the conveyor in less cross-sectional areas than the cross-sectional area of the original mass gathered by the machine but at a higher velocity than the velocity of movement of the machine.

ARNOLD S. MILLIKIN.